(12) United States Patent
Li et al.

(10) Patent No.: US 12,460,066 B2
(45) Date of Patent: Nov. 4, 2025

(54) ETHYLENE/ALPHA-OLEFIN INTERPOLYMER COMPOSITIONS WITH HIGH GLASS ADHESION

(71) Applicant: DOW GLOBAL TECHNOLOGIES LLC, Midland, MI (US)

(72) Inventors: Yuyan Li, Shanghai (CN); Weiming Ma, Shanghai (CN); Hong Yang, Shanghai (CN); Yunfeng Yang, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 624 days.

(21) Appl. No.: 17/773,562

(22) PCT Filed: Dec. 26, 2019

(86) PCT No.: PCT/CN2019/128575
§ 371 (c)(1),
(2) Date: Apr. 29, 2022

(87) PCT Pub. No.: WO2021/128127
PCT Pub. Date: Jul. 1, 2021

(65) Prior Publication Data
US 2022/0380576 A1    Dec. 1, 2022

(51) Int. Cl.
| | |
|---|---|
| C08K 5/5415 | (2006.01) |
| C08K 5/14 | (2006.01) |
| C08K 5/5425 | (2006.01) |
| C08K 5/5435 | (2006.01) |
| C08K 5/548 | (2006.01) |
| C08L 23/0807 | (2025.01) |
| C08L 83/04 | (2006.01) |
| H10F 19/80 | (2025.01) |

(52) U.S. Cl.
CPC .............. *C08K 5/5415* (2013.01); *C08K 5/14* (2013.01); *C08K 5/5425* (2013.01); *C08K 5/5435* (2013.01); *C08K 5/548* (2013.01); *C08L 23/0815* (2013.01); *C08L 83/04* (2013.01); *H10F 19/804* (2025.01)

(58) Field of Classification Search
CPC ...... C08F 8/42; C08F 255/04; C08L 23/0807; C08L 23/0815; C08K 5/5415; C08K 5/5425; C08K 5/548; C08K 5/14
USPC ........................................................ 525/342
See application file for complete search history.

(56) References Cited

U.S. PATENT DOCUMENTS

| | | | |
|---|---|---|---|
| 5,849,823 A | 12/1998 | Kale et al. | |
| 6,451,894 B1 | 9/2002 | Srinivasan et al. | |
| 8,581,094 B2 | 11/2013 | Patel et al. | |
| 8,697,984 B2 | 4/2014 | Amamiya et al. | |
| 9,349,895 B2 | 5/2016 | Ikenaga et al. | |
| 9,587,094 B2 | 3/2017 | Maeyama et al. | |
| 10,030,085 B2 | 7/2018 | Amamiya et al. | |
| 11,193,010 B2 | 12/2021 | He et al. | |
| 2011/0159439 A1 | 6/2011 | Kawashima | |
| 2011/0290317 A1 | 12/2011 | Naumovitz et al. | |
| 2012/0000514 A1 | 1/2012 | Amamiya et al. | |
| 2013/0213471 A1 | 8/2013 | Ikenaga et al. | |
| 2013/0233383 A1 | 9/2013 | Naumovitz et al. | |
| 2013/0269776 A1 | 10/2013 | Wu et al. | |
| 2013/0324671 A1 | 12/2013 | Kataoka et al. | |
| 2015/0005451 A1 | 1/2015 | Rasal et al. | |
| 2015/0031812 A1 | 1/2015 | Choi et al. | |
| 2016/0002440 A1 | 1/2016 | Maeyama et al. | |
| 2016/0115264 A1 | 4/2016 | Rohatgi et al. | |
| 2016/0233005 A1* | 8/2016 | Dalbe | C08L 23/16 |

(Continued)

FOREIGN PATENT DOCUMENTS

| | | |
|---|---|---|
| CN | 104263258 A | 1/2015 |
| CN | 105713274 A | 6/2016 |
| CN | 105950039 A | 9/2016 |

(Continued)

OTHER PUBLICATIONS

Product data sheet for Nordel IP 4520 (no date).*

(Continued)

*Primary Examiner* — Marc S Zimmer

(57) ABSTRACT

A composition comprising the following: a) an ethylene/alpha-olefin/interpolymer; b) a peroxide; c) a "Si-containing compound" selected from the following (i) through (v): (i), where each R is independently selected from a C1-C3 alkyl, and n is from 1 to 16; (ii), where each R is independently methyl or ethyl, and n is from 1 to 18; (iii), where each R is independently methyl or ethyl; (iv) a vinyl oligomericsiloxane; or (v) any combination of (i) through (iv).

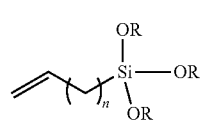

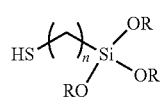

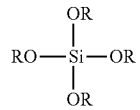

13 Claims, 1 Drawing Sheet

(56) References Cited

U.S. PATENT DOCUMENTS

2017/0005214 A1    1/2017  Yoshitake et al.

FOREIGN PATENT DOCUMENTS

| | | | |
|---|---|---|---|
| CN | 106189932 | A | 12/2016 |
| CN | 106243519 | A | 12/2016 |
| CN | 106811150 | A | 6/2017 |
| GB | 1234034 | A | 6/1971 |
| JP | 10148708 | A | 6/1998 |
| JP | 2012009688 | A | 1/2012 |
| JP | 2012017495 | A | 1/2012 |
| WO | 2012082261 | A1 | 6/2012 |
| WO | WO-2019/000744 | A1 * | 1/2019 |
| WO | 2021128128 | A | 7/2021 |
| WO | 2021133613 | A | 7/2021 |
| WO | 2021133640 | A | 7/2021 |

OTHER PUBLICATIONS

Product data sheet for Dynasylan 6598 (no date).*
PCT/CN2019/128575, International Search Report and Written Opinion with a mailing date of Dec. 26, 2019.
PCT/CN2019/128575, International Preliminary Report on Patentability with a mailing date of Jun. 28, 2022.

* cited by examiner

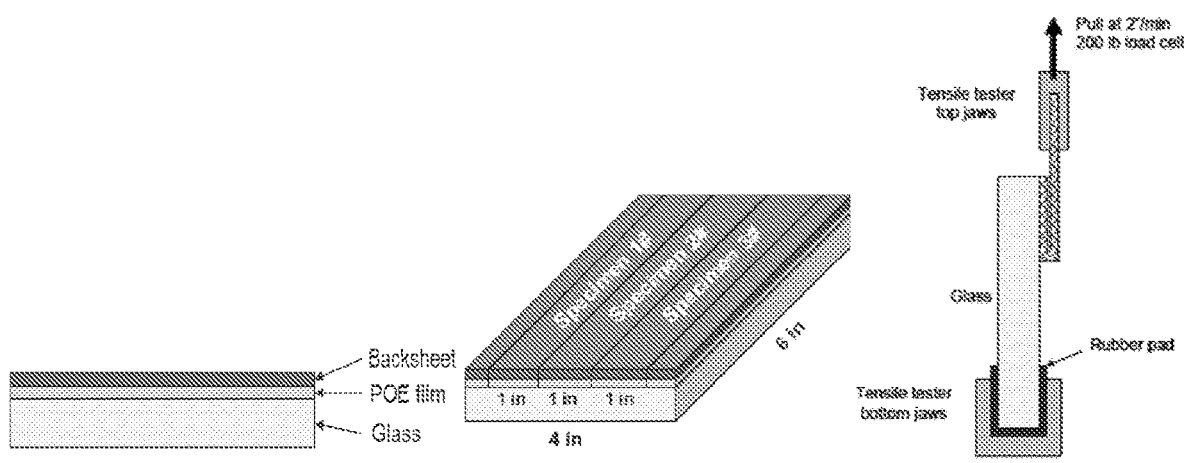

ETHYLENE/ALPHA-OLEFIN INTERPOLYMER COMPOSITIONS WITH HIGH GLASS ADHESION

BACKGROUND OF THE INVENTION

The demand for solar cell modules is increasing, due to the shortage and non-renewability of fossil fuel resources, and the need to reduce environmental pollution. A solar cell module generally includes a front side protection material (usually a glass plate), a front side encapsulant, an array of solar cells, a rear side encapsulant, and a backside protection material (could be a backsheet or a glass plate). The solar cells convert solar energy into electric energy, and are extremely fragile. These cells become corroded, if water permeates into the module. The encapsulant is designed to protect the array of cells from humidity, mechanical loads and impacts. Also, the encapsulant provides electrical isolation to prevent the loss of current. The encapsulant provides mechanical protection and some UV stability, and must have good adherence to the glass and/or backsheet.

The requirements of the encapsulant necessitate that the polymer composition, used to form the encapsulant film (photovoltaic (PV)), have good lamination performance to provide sufficient adhesion to the glass, the solar cell array and the backsheet. Also, the film must have good electrical insulation, low water vapor permeability, and good optical transparency. Current photovoltaic encapsulant films are primarily made from ethylene vinyl acetate (EVA)-based compositions. See, for example, US2013/0324671 and CN106189932A. However, EVA will release acid during the usage, which will, over time, corrode the solar cell and a solder ribbon. Also, because of the low volume resistivity (VR) of EVA, there is a greater chance for a potential induced degradation within the encapsulant. Thus, there is a need for polymer compositions that have, and maintain, strong adhesion, especially to glass, and have high volume resistivity.

CN106414592A discloses sealing films for solar cells, and which are formed from a "metallocene catalyzed" ethylene/alpha-olefin copolymer, an organic peroxide, a silane coupling agent, and magnesium hydroxide or magnesium oxide. The magnesium hydroxide or magnesium oxide prevent the formation of adhesive forces during storage, by preventing the bleeding, hydrolysis and gelation of the peroxide and the coupling agent. However, the magnesium hydroxide or magnesium oxide could potentially deteriorate the clarity of the encapsulated film. Additional polyolefin-based compositions and other compositions for solar cell modules are described in CN105950039A; CN106811150A and CN104263258A.

However, as discussed, there remains a need for polymer compositions that have, and maintain, strong adhesion, especially to glass, in initial laminate form, and after high temperature and high humidity aging, and which also have high volume resistivity. These needs have been met by the following invention.

SUMMARY OF THE INVENTION

A composition comprising the following:
a) an ethylene/alpha-olefin/interpolymer;
b) a peroxide;
c) a "Si-containing compound" selected from the following i) through v):

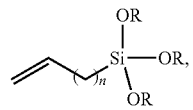

where each R is independently selected from a C1-C3 alkyl, and n is from 1 to 16;

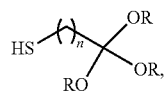

where each R is independently methyl or ethyl, and n is from 1 to 18;

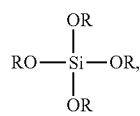

where each R is independently methyl or ethyl;
  iv) a vinyl oligomericsiloxane; or
  v) any combination of i) through iv).

BRIEF DESCRIPTION OF THE DRAWINGS

FIG. 1 depicts schematics of the following: a cross section of a laminate (left), test samples, as noted on the laminate, for the adhesion peel test (middle), and test sample configuration during the adhesion peel test (right).

DETAILED DESCRIPTION OF THE INVENTION

In a laminated solar cell module, it is necessary to have high adhesive strength between the encapsulant film and the front glass layer. Compositions have been discovered that provide, and maintain, high adhesive strength as required. In addition, these compositions have high volume resistivities and good curing properties.

As discussed above, a composition is provided, which comprises the following:
a) an ethylene/alpha-olefin/interpolymer;
b) a peroxide;
c) a "Si-containing compound" selected from the following i) through v):

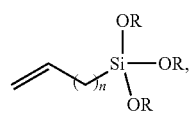

where each R is independently selected from a C1-C3 alkyl, or a C1-C2 alkyl, or C1 alkyl; and n is from 1 to 16, or from 1 to 14, or from 1 to 12, or from 1 to 10, or from 1 to 8, or from 1 to 6, or from 1 to 4;

ii)

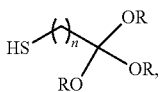

where each R is independently methyl or ethyl, or methyl; and n is from 1 to 18, or from 1 to 16, or from 1 to 14, or from 1 to 12, or from 1 to 10, or from 1 to 8, or from 1 to 6, or from 1 to 4, or from 1 to 3;

iii)

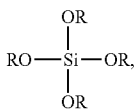

where each R is independently methyl or ethyl, or ethyl;
iv) a vinyl oligomericsiloxane; or
v) any combination of i) through iv).

The vinyl oligomericsiloxane comprises multiple ($\geq 2$) chemical molecules (or compounds) that differ only in molecular weight, and where each molecule (or compound) contains at least one vinyl group and at least one siloxane group. All of these similar molecules may be either linear, branched or cyclic.

In one embodiment, or a combination of two or more embodiments, each described herein, the "Si-containing compound" (component c) is selected from the following i) through v):

)

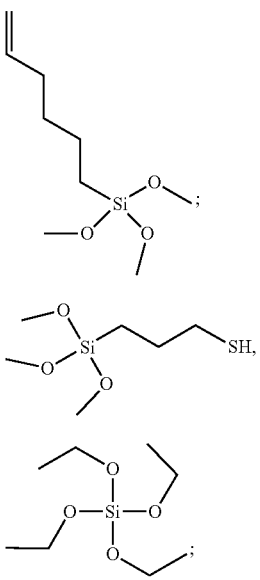

a vinyl oligomericsiloxane iv); or v) any combination of i) through iv).

In one embodiment, or a combination of two or more embodiments, each described herein, the "Si-containing compound" selected from the following:
iv) a vinyl oligomericsiloxane.

In one embodiment, or a combination of two or more embodiments, each described herein, the "Si-containing compound" is a vinyl oligomericsiloxane that comprises at least two different compounds selected from Formula 4A below:
iv) $R1_xR2_yR3_zSi_nO_m$ (Formula 4A), where R1 is vinyl, x is greater or equal to ($\geq$) 1, R2 is propyl, y is greater than or equal to ($\geq$) 0 and less than or equal to ($\leq$) 1, R3 is ethoxy or methoxy, $z=4n-x-y-m$, $1<n<10$, and $m \leq n-1$.

In one embodiment, or a combination of two or more embodiments, each described herein, the "Si-containing compound" is selected from the following:

i)

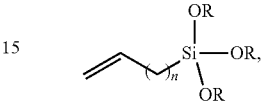

where each R is independently selected from a C1-C3 alkyl, or a C1-C2 alkyl, or C1 alkyl; and n is from 1 to 16, or from 1 to 14, or from 1 to 12, or from 1 to 10, or from 1 to 8, or from 1 to 6, or from 1 to 4;

ii)

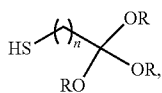

where each R is independently methyl or ethyl, or methyl; and n is from 1 to 18, or from 1 to 16, or from 1 to 14, or from 1 to 12, or from 1 to 10, or from 1 to 8, or from 1 to 6, or from 1 to 4, or from 1 to 3;

iii)

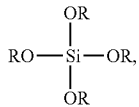

where each R is independently methyl or ethyl, or ethyl; or
v) any combination of i) through iii).

In one embodiment, or a combination of two or more embodiments, each described herein, the "Si-containing compound" is selected from the following:

ii)

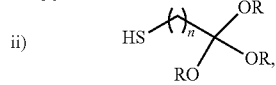

where each R is independently methyl or ethyl, or methyl; and n is from 1 to 18, or from 1 to 16, or from 1 to 14, or from 1 to 12, or from 1 to 10, or from 1 to 8, or from 1 to 6, or from 1 to 4, or from 1 to 3;

iii)

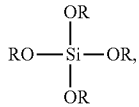

where each R is independently methyl or ethyl, or ethyl; or
v) a combination of ii) and iii).

In one embodiment, or a combination of two or more embodiments, each described herein, the "Si-containing compound" is selected from the following:

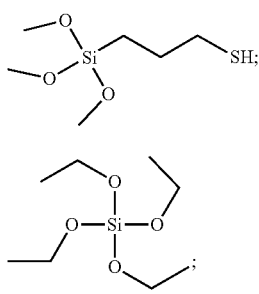

ii)

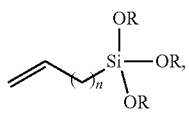

iii)

or v) a combination of ii) and iii).

In one embodiment, or a combination of two or more embodiments, each described herein, the "Si-containing compound" is selected from a combination of ii) and iii).

In one embodiment, or a combination of two or more embodiments, each described herein, the weight ratio of component iii) to component ii) is ≥2.0, or ≥2.2, or ≥2.4, or ≥2.6, or ≥2.8, or ≥3.0. In one embodiment, or a combination of two or more embodiments, each described herein, the weight ratio of component iii) to component ii) is ≤4.0, or ≤3.8, or ≤3.6, or ≤3.4, or ≤3.2.

In one embodiment, or a combination of two or more embodiments, each described herein, the "Si-containing compound" is selected from the following:

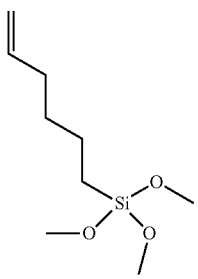

i)

where each R is independently selected from a C1-C3 alkyl, or a C1-C2 alkyl, or C1 alkyl; and n is from 1 to 16, or from 1 to 14, or from 1 to 12, or from 1 to 10, or from 1 to 8, or from 1 to 6, or from 1 to 4.

In one embodiment, or a combination of two or more embodiments, each described herein, the "Si-containing compound" is selected from the following:

i)

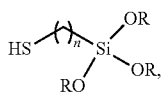

In one embodiment, or a combination of two or more embodiments, each described herein, the "Si-containing compound" is selected from the following:

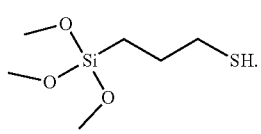

ii)

where each R is independently methyl or ethyl, or methyl; and n is from 1 to 18, or from 1 to 16, or from 1 to 14, or from 1 to 12, or from 1 to 10, or from 1 to 8, or from 1 to 6, or from 1 to 4, or from 1 to 3.

In one embodiment, or a combination of two or more embodiments, each described herein, the "Si-containing compound" is selected from the following:

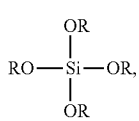

ii)

In one embodiment, or a combination of two or more embodiments, each described herein, the "Si-containing compound" is selected from the following:

iii)

$$RO-\underset{\underset{OR}{|}}{\overset{\overset{OR}{|}}{Si}}-OR,$$

where each R is independently methyl or ethyl, or ethyl.

In one embodiment, or a combination of two or more embodiments, each described herein, the "Si-containing compound" is selected from the following:

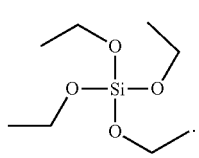

iii)

The crosslinking coagent promotes the crosslinking reactions within the polymer composition. Coagent include, but are not limited to, triallylisocyanurate, triallylcyanurate and trimethylolpropanetrimethacrylate, divinyl benzene, acrylates and methacrylates of polyols, allyl alcohol derivatives, and low molecular weight polybutadiene.

In one embodiment, or a combination of two or more embodiments, each described herein, the composition further comprises a coagent. In one embodiment, or a combination of two or more embodiments, each described herein, the weight ratio of the peroxide to the coagent is ≥0.5, ≥0.8, ≥1.0, or ≥1.2, or ≥1.4, or ≥1.6, or ≥1.8, or ≥2.0. In one embodiment, or a combination of two or more embodiments, each described herein, the weight ratio of the peroxide to the coagent is ≤3.0, or ≤2.8, or ≤2.6, or ≤2.4, or ≤2.2.

Peroxides (containing at least one "—O—O—" group), are preferably organic peroxides, such as, for example, t-butylperoxy 2-ethylhexyl carbonate; di-t-butyl peroxide; t-butylcumyl peroxide; dicumyl peroxide; 2,5-dimethyl-2,5- di-(t-butylperoxy) hexane; di-(t-butylperoxy-isopropyl) benzene; t-butyl peroxybenzoate; 1,1-di-(t-butylperoxy)-3,3,5-trimethyl-cyclohexane; 2,5-dimethyl-2,5-di(t-amylperoxy)-hexane; 2,5-dimethyl-2, 5-di(t-butyl-peroxy)hexyne-3, 2,5-dimethyl-2,5-di(t-amylperoxy)hexyne-3; di-t-amyl peroxide; 1,3-dimethyl-3-(t-butyl-peroxy)butanol; 1,3-dimethyl-3-(t-amylperoxy)butanol; and mixtures of two or more of these initiators. See, for example, TRIGONOX peroxides from AkzoNobel, LUPEROX peroxides from ARKEMA.

In one embodiment, or a combination of two or more embodiments, each described herein, the weight ratio of the peroxide to the "Si-containing compound" is ≥1.0, or ≥1.5, ≥2.0, or ≥2.2, or ≥2.4, or ≥2.6, or ≥2.8, or ≥3.0, or ≥3.2, or ≥3.4, or ≥3.6, or ≥3.8, or ≥4.0. In one embodiment, or a combination of two or more embodiments, each described herein, the wherein the weight ratio of the peroxide to the "Si-containing compound" is ≤6.0, or ≤5.8, or ≤5.6, or ≤5.4, or ≤5.2, or ≤5.0, or ≤4.8, or ≤4.6, or ≤4.4, or ≤4.2.

Hindered Amine Light Stabilizers (HALS) are chemical compounds containing an amine functional group, and which are used as stabilizers in polymer compositions. The nitrogen atom of the amine is partially shielded by neighboring groups, to reduce the potential for side reactions with the nitrogen atom. Hindered amines include, but are not limited to, TINUVIN 770 (Bis-(2,2,6,6-tetramethyl-4-piperidinyl)sebacate), CYASORB UV 3529, HOSTAVIN N30, UNIVIL 4050, UNIVIN 5050, CHIMASSORB UV 119, CHIMASSORB 944 LD, and TINUVIN 622 LD.

In one embodiment, or a combination of two or more embodiments, each described herein, the composition further comprises a hindered amine light stabilizer. In one embodiment, or a combination of two or more embodiments, each described herein, the weight ratio of the "Si-containing compound" to the hindered amine is ≥1.0, ≥2.0, ≥3.0, or ≥3.1, or ≥3.2, or ≥3.3, or ≥3.4, or ≥3.5. In one embodiment, or a combination of two or more embodiments, each described herein, the weight ratio of the "Si-containing compound" to the hindered amine is ≤7.0, or ≤6.8, or ≤6.6, or ≤6.4, or ≤6.2, or ≤6.0.

In one embodiment, or a combination of two or more embodiments, each described herein, the composition comprises ≥50.0 wt %, ≥60.0 wt %, or ≥70.0 wt %, or ≥80.0 wt %, or ≥90.0 wt % of the ethylene/alpha-olefin interpolymer (component a), based on the weight of the composition. In one embodiment, or a combination of two or more embodiments, each described herein, the composition comprises ≥95.0 wt %, or ≥95.5 wt %, or ≥96.0 wt %, or ≥96.5 wt %, or ≥97.0 wt %, or ≥97.5 wt %, or ≥98.0 wt % of the ethylene/alpha-olefin interpolymer (component a), based on the weight of the composition.

In one embodiment, or a combination of two or more embodiments, each described herein, the composition comprises ≤99.8 wt %, ≤99.6 wt %, or ≤99.4 wt %, or ≤99.2 wt %, or ≤99.0 wt %, or ≤98.8 wt %, or ≤98.6 wt %, or ≤98.4 wt %, or ≤98.2 wt % of the ethylene/alpha-olefininterpolymer (component a), based on the weight of the composition.

In one embodiment, or a combination of two or more embodiments, each described herein, the composition comprises ≥98.5 wt %, or ≥99.0 wt %, or ≥99.1 wt %, or ≥99.2 wt %, or ≥99.3 wt %, or ≥99.4 wt % of the sum of components a)-c), based on the weight of the composition. In one embodiment, or a combination of two or more embodiments, each described herein, the composition comprises ≤100.0 wt %, or ≤99.9 wt %, ≤99.8 wt %, or ≤99.7 wt %, or ≤99.6 wt %, or ≤99.5 wt % of the sum of components a)-c), based on the weight of the composition.

In one embodiment, or a combination of two or more embodiments, each described herein, for the ethylene/alpha-olefin interpolymer (component a), the alpha-olefin is a C3-C20 alpha-olefin, and further a C3-C10 alpha-olefin. In one embodiment, or a combination of two or more embodiments, each described herein, the alpha-olefin is selected from propylene, 1-butene, 1-pentene, 1-hexene or 1-octene, and further propylene, 1-butene or 1-octene, and further 1-butene or 1-octene, and further 1-octene.

In one embodiment, or a combination of two or more embodiments, each described herein, the ethylene/alpha-olefin interpolymer (component a) is an ethylene/alpha-olefin copolymer. In one embodiment, or a combination of two or more embodiments, each described herein, the ethylene/alpha-olefin interpolymer (component a) is selected from the following: an ethylene/propylene copolymer, an ethylene/butene copolymer, or an ethylene/octene copolymer, and further an ethylene/butene copolymer, or an ethylene/octene copolymer, and further an ethylene/octene copolymer.

In one embodiment, or a combination of two or more embodiments, each described herein, the ethylene/alpha-olefin interpolymer (component a) has a density ≥0.860 g/cc, or ≥0.865 g/cc, or ≥0.868 g/cc, or ≥0.870 g/cc, or ≥0.872 g/cc, or ≥0.874 g/cc, or ≥0.876 g/cc, or ≥0.878 g/cc, or ≥0.880 g/cc (1 cc=1 $cm^3$). In one embodiment, or a combination of two or more embodiments, each described herein, the ethylene/alpha-olefin interpolymer has a density ≤0.900 g/cc, or ≤0.898 g/cc, or ≤0.896 g/cc, or ≤0.894 g/cc, or ≤0.892 g/cc, or ≤0.890 g/cc, or ≤0.888 g/cc, or ≤0.886 g/cc, or ≤0.884 g/cc, or ≤0.882 g/cc.

In one embodiment, or a combination of two or more embodiments, each described herein, the ethylene/alpha-olefin interpolymer (component a) has a melt index (I2)≥8.0 g/10 min, or ≥10 g/10 min, or ≥12 g/10 min, or ≥14 g/10 min, or ≥16 g/10 min, or ≥18 g/10 min. In one embodiment, or a combination of two or more embodiments, each described herein, the ethylene/alpha-olefin interpolymer has a melt index (I2)≤35 g/10 min, or ≤30 g/10 min, or ≤28 g/10 min, or ≤26 g/10 min, or ≤24 g/10 min, or ≤22 g/10 min, or ≤20 g/10 min.

The invention also provides a crosslinked composition formed from the composition of any one embodiment, or a combination of two or more embodiments, each described herein.

In one embodiment, or a combination of two or more embodiments, each described herein, the composition has a glass adhesion strength ≥90 N/cm, or ≥92 N/cm, or ≥94 N/cm, or ≥96 N/cm, or ≥100 N/cm, or ≥110 N/cm, or ≥120 N/cm, or ≥130 N/cm, or ≥140 N/cm. In one embodiment, or a combination of two or more embodiments, each described herein, the composition has a glass adhesion strength, after aging at 85 C, 85% humidity, 1000 h, ≥70 N/cm, or ≥75 N/cm, or ≥80 N/cm, or ≥85 N/cm, or ≥90 N/cm, or ≥95 N/cm, or ≥100 N/cm, or ≥105 N/cm.

In one embodiment, or a combination of two or more embodiments, each described herein, the composition has a Volume Resistivity ≥$1.0 \times 10^{14}$ ohm·cm, or ≥$5.0 \times 10^{15}$ ohm·cm, ≥$1.0 \times 10^{16}$ ohm·cm, or ≥$2.0 \times 10^{16}$ ohm·cm, or ≥$3.0 \times 10^{16}$ ohm·cm, or ≥$4.0 \times 10^{16}$ ohm·cm, or ≥$5.0 \times 10^{16}$ ohm·cm. In one embodiment, or a combination of two or more embodiments, each described herein, the wherein the composition has a Volume Resistivity ≥$1.0 \times 10^{17}$ ohm·cm, or ≥$1.2 \times 10^{17}$ ohm·cm, or ≥$1.4 \times 10^{17}$ ohm·cm, or ≥$1.6 \times 10^{17}$ ohm·cm, or ≥$1.8 \times 10^{17}$ ohm·cm, or ≥$1.9 \times 10^{17}$ ohm·cm.

The invention also provides an article comprising at least one component formed from the composition of any one embodiment, or a combination of two or more embodiments, each described herein. In one embodiment, or a combination of two or more embodiments, each described herein, the article is a film, and further an extruded film. In one embodiment, or a combination of two or more embodiments, each described herein, the article is a solar cell module.

The invention also provides a process of forming a solar cell module, said process comprising laminating an "array of solar cells" between two film layers, and wherein each film layer is, independently, formed from the composition of any one embodiment, or a combination of two or more embodiments, each described herein. In a further embodiment, each film layer is formed from the same composition.

In one embodiment, or a combination of two or more embodiments, each described herein, an inventive composition further comprises a thermoplastic polymer, different from the interpolymer of component a), in one or more features, such as monomer(s) types and/or amounts, Mn, Mw, Mz, MWD, Mooney Viscosity, V0.1, V100, RR, or any combination thereof. Polymers include, but not limited to, ethylene-based polymers, propylene-base polymers, and olefin multi-block interpolymers. Suitable ethylene-base polymers include, but are not limited to, high density polyethylene (HDPE), linear low density polyethylene (LLDPE), very low density polyethylene (VLDPE), ultra-low density polyethylene (ULDPE), homogeneously branched linear ethylene-based polymers, and homogeneously branched substantially linear ethylene-based polymers (that is homogeneously branched, long chain branched ethylene polymers). Suitable propylene-base polymers include, but are not limited to, polypropylene homopolymers and propylene/ethylene copolymers.

The inventive composition may comprise a combination of two or more embodiments, as described herein. The ethylene/alpha-olefin interpolymer may comprise a combination of two or more embodiments, as described herein. The peroxide may comprise a combination of two or more embodiments, as described herein. The "Si-containing compound" may comprise a combination of two or more embodiments, as described herein.

Definitions

Unless stated to the contrary, implicit from the context, or customary in the art, all parts and percents are based on weight, and all test methods are current as of the filing date of this disclosure.

The term "composition," as used herein, includes a mixture of materials, which comprise the composition, as well as reaction products and decomposition products formed from the materials of the composition. Any reaction product or decomposition product is typically present in trace or residual amounts.

The term "polymer," as used herein, refers to a polymeric compound prepared by polymerizing monomers, whether of the same or a different type. The generic term polymer thus, includes the term homopolymer (employed to refer to polymers prepared from only one type of monomer, with the understanding that trace amounts of impurities can be incorporated into the polymer structure), and the term interpolymer as defined hereinafter. Trace amounts of impurities, such as catalyst residues, can be incorporated into and/or within the polymer. Typically, a polymer is stabilized with very low amounts ("ppm" amounts) of one or more stabilizers.

The term "interpolymer," as used herein, refers to a polymer prepared by the polymerization of at least two different types of monomers. The term interpolymer thus includes the term copolymer (employed to refer to polymers prepared from two different types of monomers) and polymers prepared from more than two different types of monomers.

The term "propylene-based polymer," as used herein, refers to a polymer that comprises, in polymerized form, a majority weight percent of propylene (based on the weight of the polymer), and optionally may comprise one or more comonomers.

The term "ethylene-based polymer," as used herein, refers to a polymer that comprises, in polymerized form, 50 wt % or a majority weight percent of ethylene (based on the weight of the polymer), and optionally may comprise one or more comonomers.

The term "ethylene/alpha-olefin interpolymer," as used herein, refers to a random interpolymer that comprises, in polymerized form, 50 wt % or a majority weight percent of ethylene (based on the weight of the interpolymer), and an alpha-olefin.

The term, "ethylene/alpha-olefin copolymer," as used herein, refers to a random copolymer that comprises, in polymerized form, 50 wt % or a majority amount of ethylene monomer (based on the weight of the copolymer), and an alpha-olefin, as the only two monomer types.

The term "Si-containing compound," as used herein, refers to a compound containing at least one "Si" atom, and at least one "—$CH_2$—" group and/or and at least one "—$CH_3$" group.

The term "solar cell (or photovoltaic cell)," as used herein, refers to a device that converts solar radiation into electricity. Solar cells are typically presented in an array pattern.

The term "solar cell module (or solar panel or solar module)," as used herein, refers to a photovoltaic panel which comprises an assembly of solar cells.

The term "laminating, lamination, and similar terms," as used herein, refer to the process, in which multiple layered materials are bonded together under heat and pressure, and an optional vacuum.

The terms "comprising," "including," "having," and their derivatives, are not intended to exclude the presence of any additional component, step or procedure, whether the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure, not specifically delineated or listed.

Listing of Some Composition Features

A] A composition comprising the following:
  a) an ethylene/alpha-olefin/interpolymer;
  b) a peroxide;
  c) a "Si-containing compound" selected from the following i) through v):

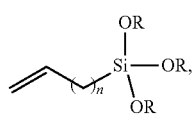

i)

where each R is independently selected from a C1-C3 alkyl, or a C1-C2 alkyl, or C1 alkyl; and n is from 1 to 16, or from 1 to 14, or from 1 to 12, or from 1 to 10, or from 1 to 8, or from 1 to 6, or from 1 to 4;

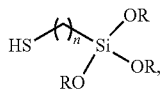
ii)

where each R is independently methyl or ethyl, or methyl; and n is from 1 to 18, or from 1 to 16, or from 1 to 14, or from 1 to 12, or from 1 to 10, or from 1 to 8, or from 1 to 6, or from 1 to 4, or from 1 to 3;

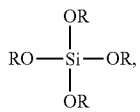
iii)

where each R is independently methyl or ethyl, or ethyl;
  iv) a vinyl oligomericsiloxane; or
  v) any combination of i) through iv).
B] The composition of A] above, wherein the "Si-containing compound" (component c) is selected from the following i) through v):

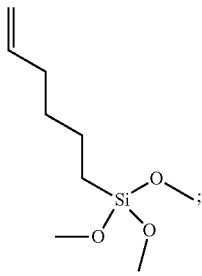
i)

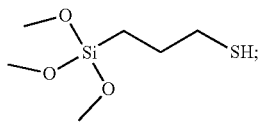
ii)

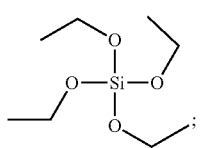
iii)

iv) a vinyl oligomericsiloxane, or v) any combination of i) through iv).
C] The composition of A] above, wherein the "Si-containing compound" is selected from the following:
  iv) a vinyl oligomericsiloxane.
D] The composition of C] above, wherein the Si-containing compound" is a vinyl oligomericsiloxane that comprises at least two different compounds selected from Formula 4A below:

iv) $R1_xR2_yR3_zSi_nO_m$ (Formula 4A), where R1 is vinyl, x is greater or equal to ($\geq$) 1, R2 is propyl, y is greater than or equal to ($\geq$) 0 and less than or equal to ($\leq$) 1, R3 is ethoxy or methoxy, z=4n-x-y-m, 1<n<10, and m$\leq$n−1.
E] The composition of A] above, wherein the "Si-containing compound" is selected from the following:

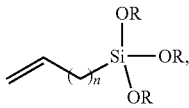
i)

where each R is independently selected from a C1-C3 alkyl, or a C1-C2 alkyl, or C1 alkyl; and n is from 1 to 16, or from 1 to 14, or from 1 to 12, or from 1 to 10, or from 1 to 8, or from 1 to 6, or from 1 to 4;

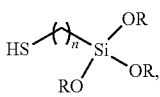
ii)

where each R is independently methyl or ethyl, or methyl; and n is from 1 to 18, or from 1 to 16, or from 1 to 14, or from 1 to 12, or from 1 to 10, or from 1 to 8, or from 1 to 6, or from 1 to 4, or from 1 to 3;

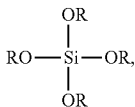
iii)

where each R is independently methyl or ethyl, or ethyl; or
  v) any combination of i) through iii).
F] The composition of E] above, wherein the "Si-containing compound" (component c) is selected from the following i) through v):

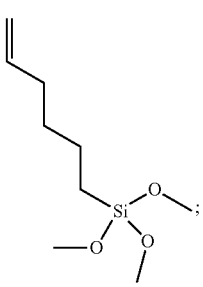
i)

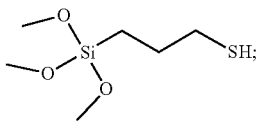
ii)

iii)

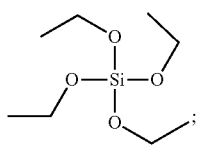

or v) any combination of i) through iii).

G] The composition of A] above, wherein the "Si-containing compound" selected from the following:

ii)

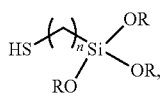

where each R is independently methyl or ethyl, or methyl; and n is from 1 to 18, or from 1 to 16, or from 1 to 14, or from 1 to 12, or from 1 to 10, or from 1 to 8, or from 1 to 6, or from 1 to 4, or from 1 to 3;

iii)

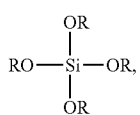

where each R is independently methyl or ethyl, or ethyl;

v) a combination of ii) and iii).

H] The composition of G] above, wherein the "Si-containing compound" is selected from the following:

ii)

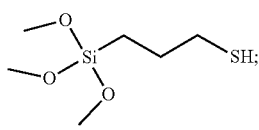

iii)

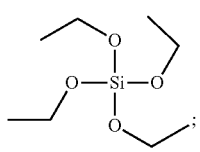

or v) a combination of ii) and iii).

I] The composition of G] or H] above, wherein the "Si-containing compound" is selected from a combination of ii) and iii).

J] The composition of any one of G]-I] (G through I) above, wherein the weight ratio of component iii) to component ii) is ≥2.0, or ≥2.2, or ≥2.4, or ≥2.6, or ≥2.8, or ≥3.0.

K] The composition of any one of G]-J] above, wherein the weight ratio of component iii) to component ii) is ≤4.0, or ≤3.8, or ≤3.6, or ≤3.4, or ≤3.2.

L] The composition of A] above, wherein the "Si-containing compound" is selected from the following:

i)

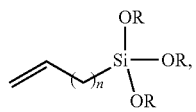

where each R is independently selected from a C1-C3 alkyl, or a C1-C2 alkyl, or C1 alkyl; and n is from 1 to 16 or from 1 to 14, or from 1 to 12, or from 1 to 10, or from 1 to 8, or from 1 to 6, or from 1 to 4.

M] The composition of L) above, wherein the "Si-containing compound" is selected from the following:

i)

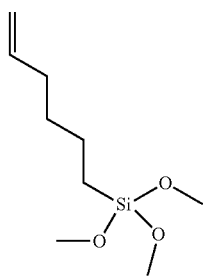

N] The composition of A] above, wherein the "Si-containing compound" is selected from the following:

ii)

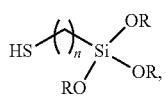

where each R is independently methyl or ethyl, or methyl; and n is from 1 to 18, or from 1 to 16, or from 1 to 14, or from 1 to 12, or from 1 to 10, or from 1 to 8, or from 1 to 6, or from 1 to 4, or from 1 to 3.

O] The composition of N] above, wherein the "Si-containing compound" is selected from the following:

ii)

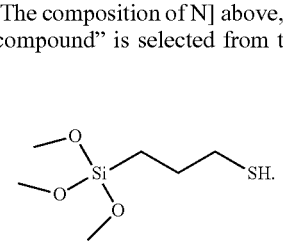

P] The composition of A] above, wherein the "Si-containing compound" is selected from the following:

iii)

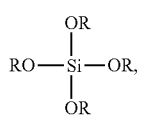

where each R is independently methyl or ethyl, or ethyl.

Q] The composition of P] above, wherein the "Si-containing compound" is selected from the following:

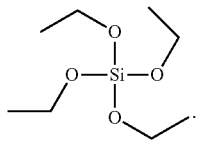

R] The composition of any one of A]-Q] (A through Q) above, wherein the composition further comprises a crosslinking coagent.

S] The composition of R] above, wherein the composition comprises ≥0.05 wt %, or ≥0.10 wt %, or ≥0.15 wt %, or ≥0.20 wt % of the crosslinking coagent, based on the weight of the composition.

T] The composition of R] or S] above, wherein the composition comprises ≤1.50 wt %, or ≤1.40 wt %, or ≤1.30 wt %, or ≤1.20 wt %, or ≤1.10 wt %, or ≤1.00 wt % of the crosslinking coagent, based on the weight of the composition.

U] The composition of any one of R]-T] above, wherein the coagent is the following:

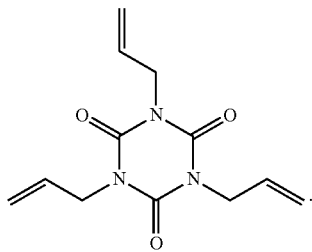 [SMILES: C=CCn1c(=O)n(CC=C)c(=O)n(CC=C)c1=O]

V] The composition of any one of R]-U] above, wherein the weight ratio of the peroxide to the coagent is ≥0.5, or ≥0.8, or ≥1.0, or ≥1.2, or ≥1.4, or ≥1.6, or ≥1.8, or ≥2.0.

W] The composition of any one of R]-V] above, wherein the weight ratio of the peroxide to the coagent is ≤3.0, or ≤2.8, or ≤2.6, or ≤2.4, or ≤2.2.

X] The composition of any one of A]-W] above, wherein the composition comprises ≥0.01 wt %, or ≥0.02 wt %, or ≥0.04 wt %, or ≥0.06 wt %, or ≥0.08 wt %, or ≥0.10 wt % of the "Si-containing compound," based on the weight of the composition.

Y] The composition of any one of A]-X] above, wherein the composition comprises ≤1.00 wt %, or ≤0.80 wt %, or ≤0.60 wt %, or ≤0.40 wt % of the "Si-containing compound," based on the weight of the composition.

Z] The composition of any one of A]-Y] above, wherein the weight ratio of the peroxide to the "Si-containing compound" is ≥1.0, or ≥1.5, ≥2.0, or ≥2.2, or ≥2.4, or ≥2.6, or ≥2.8, or ≥3.0, or ≥3.2, or ≥3.4, or ≥3.6, or ≥3.8, or ≥4.0.

AA] The composition of any one of A]-Z] above, wherein the weight ratio of the peroxide to the "Si-containing compound" is ≤6.0, or ≤5.8, or ≤5.6, or ≤5.4, or ≤5.2, or ≤5.0, or ≤4.8, or ≤4.6, or ≤4.4, or ≤4.2.

BB] The composition of any one of A]-AA] above, wherein the composition comprises ≥0.1 wt %, or ≥0.2 wt %, or ≥0.4 wt %, or ≥0.6 wt %, or ≥0.8 wt %, or ≥1.0 wt % of the peroxide, based on the weight of the composition.

CC] The composition of any one of A]-BB] above, wherein the composition comprises ≤3.0 wt %, or ≤2.8 wt %, or ≤2.6 wt %, or ≤2.4 wt %, or ≤2.2 wt %, or ≤2.0 wt % of the peroxide, based on the weight of the composition.

DD] The composition of any one of A]-CC] above, wherein the peroxide is selected from the following:

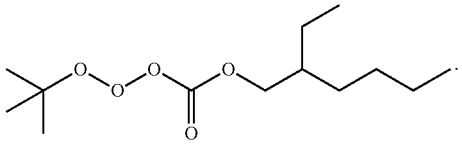 [SMILES: CCCCC(CC)COC(=O)OOOC(C)(C)C]

EE] The composition of any one of A]-DD] above, wherein the composition further comprises a hindered amine.

FF) The composition of EE] above, wherein the hindered amine is as follows:

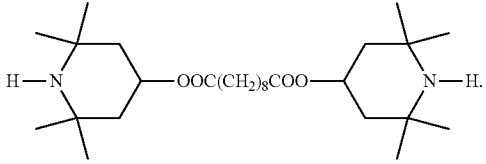

GG] The composition of EE] or FF] above, wherein the weight ratio of the "Si-containing compound" to the hindered amine is ≥1.0, or ≥2.0, or ≥3.0, or ≥3.1, or ≥3.2, or ≥3.3, or ≥3.4, or ≥3.5.

HH] The composition of any one of EE]-GG] above, wherein the weight ratio of the "Si-containing compound" to the hindered amine is ≤7.0, or ≤6.8, or ≤6.6, or ≤6.4, or ≤6.2, or ≤6.0.

II] The composition of any one of A]-HH] above, wherein the composition comprises ≥50.0 wt %, or ≥60.0 wt %, or ≥70.0 wt %, or ≥80.0 wt %, or ≥90.0 wt % of the ethylene/alpha-olefin interpolymer (component a), based on the weight of the composition.

JJ] The composition of any one of A]-II] above, wherein the composition comprises ≥80.0 wt %, or ≥82.0 wt %, or ≥84.0 wt %, or ≥86.0 wt %, or ≥88.0 wt %, or ≥90.0 wt %, or ≥92.0 wt %, or ≥94.0 wt % of the ethylene/alpha-olefin interpolymer (component a), based on the weight of the composition.

KK] The composition of any one of A]-JJ] above, wherein the composition comprises ≥95.0 wt %, or ≥95.5 wt %, or ≥96.0 wt %, or ≥96.5 wt %, or ≥97.0 wt %, or ≥97.5 wt %, or ≥98.0 wt % of the ethylene/alpha-olefin interpolymer (component a), based on the weight of the composition.

LL] The composition of any one of A]-KK] above, wherein the composition comprises ≤99.8 wt %, ≤99.6 wt %, or ≤99.4 wt %, or ≤99.2 wt %, or ≤99.0 wt %, or ≤98.8 wt %, or ≤98.6 wt %, or ≤98.4 wt %, or ≤98.2 wt % of the ethylene/alpha-olefin interpolymer (component a), based on the weight of the composition.

MM] The composition of any one of A]-LL] above, wherein the composition comprises ≥98.5%, ≥99.0 wt %, or ≥99.1 wt %, or ≥99.2 wt %, or ≥99.3 wt %, or ≥99.4 wt % of the sum of components a)-c), based on the weight of the composition.

NN] The composition of any one of A]-MM] above, wherein the composition comprises ≤100.0 wt %, or ≤99.9 wt %, ≤99.8 wt %, or ≤99.7 wt %, or ≤99.6 wt %, or ≤99.5 wt % of the sum of components a)-c), based on the weight of the composition.

OO] The composition of any one of A]-NN] above, wherein, for the ethylene/alpha-olefin interpolymer, the alpha-olefin is a C3-C20 alpha-olefin, and further a C3-C10 alpha-olefin.

PP] The composition of any one of A]-OO] above, wherein, for the ethylene/alpha-olefin interpolymer, the alpha-olefin is selected from propylene, 1-butene, 1-pentene, 1-hexene or 1-octene, and further propylene, 1-butene or 1-octene, and further 1-butene or 1-octene, and further 1-octene.

QQ] The composition of any one of A]-PP] above, wherein the ethylene/alpha-olefin interpolymer (component a) is an ethylene/alpha-olefin copolymer.

RR] The composition of any one of A]-QQ] above, wherein the ethylene/alpha-olefin interpolymer (component a) is selected from the following: an ethylene/propylene copolymer, an ethylene/butene copolymer, or an ethylene/octene copolymer, and further an ethylene/butene copolymer, or an ethylene/octene copolymer, and further an ethylene/octene copolymer.

SS] The composition of any one of A]-RR] above, wherein the ethylene/alpha-olefin interpolymer (component a) has a density ≥0.860 g/cc, ≥0.865 g/cc, ≥0.870 g/cc, or ≥0.872 g/cc, or ≥0.874 g/cc, or ≥0.876 g/cc, or ≥0.878 g/cc, or ≥0.880 g/cc (1 cc=1 cm$^3$).

TT] The composition of any one of A]-SS] above, wherein the ethylene/alpha-olefin interpolymer has a density ≤0.900 g/cc, or ≤0.898 g/cc, or ≤0.896 g/cc, or ≤0.894 g/cc, or ≤0.892 g/cc, or ≤0.890 g/cc, or ≤0.888 g/cc, or ≤0.886 g/cc, or ≤0.884 g/cc, or ≤0.882 g/cc.

UU] The composition of any one of A]-TT] above, wherein the ethylene/alpha-olefin interpolymer (component a) has a melt index (I2)≥8.0 g/10 min, or ≥10 g/10 min, or ≥12 g/10 min, or ≥14 g/10 min, or ≥16 g/10 min, or ≥18 g/10 min.

VV] The composition of any one of A]-UU] above, wherein the ethylene/alpha-olefin interpolymer has a melt index (I2)≤35 g/10 min, or ≤30 g/10 min, or ≤28 g/10 min, or ≤26 g/10 min, or ≤24 g/10 min, or ≤22 g/10 min, or ≤20 g/10 min.

WW] The composition of any one of A]-VV] above, wherein, the ethylene/alpha-olefin interpolymer (component a) has a molecular weight distribution MWD (=Mw/Mn)≥1.70, or ≥1.75, or ≥1.80, or ≥1.85, or ≥1.90, or ≥1.95, or ≥2.00.

XX] The composition of any one of A]-WW] above, wherein the ethylene/alpha-olefin interpolymer has a molecular weight distribution MWD≤2.70, or ≤2.65, or ≤2.60, or ≤2.55, or ≤2.50, or ≤2.45, or ≤2.40, or ≤2.35, or ≤2.30, or ≤2.25, or ≤2.20.

YY] The composition of any one of A]-XX] above, wherein the ethylene/alpha-olefin interpolymer (component a) has a number average molecular weight Mn≥10,000 g/mol, or ≥12,000 g/mol, or ≥14,000 g/mol, or ≥16,000 g/mol, or ≥18,000 g/mol, or ≥20,000 g/mol.

ZZ] The composition of any one of A]-YY] above, wherein the ethylene/alpha-olefin interpolymer has a number average molecular weight Mn≤50,000 g/mol, or ≤45,000 g/mol, or ≤40,000 g/mol, or ≤35,000 g/mol, or ≤30,000 g/mol, or ≤25,000 g/mol.

A3] The composition of any one of A]-ZZ] above, wherein the ethylene/alpha-olefin interpolymer has a weight average molecular weight Mw≥30,000 g/mol, or ≥35,000 g/mol, or ≥40,000 g/mol, or ≥45,000 g/mol.

B3] The composition of any one of A]-A3] above, wherein the ethylene/alpha-olefin interpolymer has a weight average molecular weight Mw≤70,000 g/mol, or ≤65,000 g/mol, or ≤60,000 g/mol, or ≤55,000 g/mol.

C3] The composition of any one of A]-B3] above, wherein the ethylene/alpha-olefin interpolymer (component a) has a melting temperature (Tm, DSC)≥60° C., or ≥65° C., or ≥70° C., or ≥72° C., or ≥74° C., or ≥76° C., or ≥78° C., or ≥80° C.

D3] The composition of any one of A]-C3] above, wherein the ethylene/alpha-olefin interpolymer has a melting temperature (Tm, DSC)≤100° C., or ≤95° C., or ≤90° C., or ≤88° C., or ≤86° C., or ≤84° C., or ≤82° C.

E3] The composition of any one of A]-D3] above, wherein the ethylene/alpha-olefin interpolymer has a crystallization temperature (Tc, DSC)≥40° C., or ≥45° C., or ≥50° C., or ≥52° C., or ≥54° C., or ≥56° C.

F3] The composition of any one of A]-E3] above, wherein the ethylene/alpha-olefin interpolymer has a crystallization temperature (Tc, DSC)≤70° C., or ≤68° C., or ≤66° C., or ≤64° C., or ≤62° C., or ≤60° C.

G3] The composition of any one of A]-F3] above, wherein the ethylene/alpha-olefin interpolymer has a glass transition temperature (Tg, DSC)≥−70° C., or ≥−65° C., or ≥−60° C., or −58° C., or ≥−56° C., or ≥−54° C., or ≥−52° C., or ≥−50° C.

H3] The composition of any one of A]-G3] above, wherein the ethylene/alpha-olefin interpolymer has a glass transition temperature (Tg, DSC)≤−30° C., or ≤−35° C., or ≤−38° C., or ≤−40° C., or ≤−42° C., or ≤−44° C., or ≤−46° C.

I3] The composition of any one of A]-H3] above, wherein the composition comprises ≤0.002 wt %, or ≤0.001 wt %, or ≤0.0005 wt % of titanium dioxide, based on the weight of the composition.

J3] The composition of any one of A]-I3] above, wherein the composition does not comprise titanium dioxide.

K3] The composition of any one of A]-J3] above, wherein the composition comprises ≤0.002 wt %, or ≤0.001 wt %, or ≤0.0005 wt % of magnesium hydroxide, based on the weight of the composition.

L3] The composition of any one of A]-K3] above, wherein the composition does not comprise magnesium hydroxide.

M3] The composition of any one of A]-L3] above, wherein the composition comprises ≤0.002 wt %, or ≤0.001 wt %, or ≤0.0005 wt % of magnesium oxide, based on the weight of the composition.

N3] The composition of any one of A]-M3] above, wherein the composition does not comprise magnesium oxide.

O3] The composition of any one of A]-N3] above, wherein the composition comprises ≤0.002 wt %, or ≤0.001 wt %, or ≤0.0005 wt % of polymeric microspheres (such as crosslinked polymeric microspheres), based on the weight of the composition.

P3] The composition of any one of A]-O3] above, wherein the composition does not comprise polymeric microspheres (such as crosslinked polymeric microspheres).

Q3] A crosslinked composition formed from the composition of any one of A]-P3] above.

R3] The composition of any one of A]-Q3] above, wherein the composition has a glass adhesion strength ≥90 N/cm, or ≥92 N/cm, or ≥94 N/cm, or ≥96 N/cm.

S3] The composition of any one of A]-R3] above, wherein the composition has a glass adhesion strength ≥100 N/cm, or ≥110 N/cm, or ≥120 N/cm, or ≥130 N/cm, or ≥140 N/cm.

T3] The composition of any one of A]-S3] above, wherein the composition has a glass adhesion strength, after aging at 85° C., 85% humidity, 1000 h, ≥70 N/cm, or ≥75 N/cm, or ≥80 N/cm, or ≥85 N/cm, or ≥90 N/cm, or ≥95 N/cm, or ≥100 N/cm, or ≥105 N/cm.

U3] The composition of any one of A]-T3] above, wherein the composition has a maintained glass adhesion strength, after aging at 85° C., 85% humidity, 1000 h, ≥50%, or ≥55%, or ≥60%, or ≥65%, or ≥70%.

V3] The composition of any one of A]-U3] above, wherein the composition has a Volume Resistivity ≥1.0 x10$^{14}$ ohm·cm, or ≥5.0×10$^{15}$ ohm·cm, or ≥2.0×10$^{16}$ ohm·cm, or ≥2.5×10$^{16}$ ohm·cm, or ≥3.0×10$^{16}$ ohm·cm, or ≥4.0×10$^{16}$ ohm·cm, or ≥5.0×10$^{16}$ ohm·cm.

W3] The composition of any one of A]-V3] above, wherein the composition has a Volume Resistivity ≥1.0×10$^{17}$ ohm·cm, or ≥1.2×10$^{17}$ ohm·cm, or ≥1.4×10$^{17}$ ohm·cm, or ≥1.6×10$^{17}$ ohm·cm, or ≥1.8×10$^{17}$ ohm·cm, or ≥1.9×10$^{17}$ ohm·cm.

X3] The composition of any one of A]-W3] above, wherein the composition has a Volume Resistivity≤1×10$^{19}$ ohm·cm.

Y3] An article comprising at least one component formed from the composition of any one of A]-X3] above.

Z3] The article of Y3] above, wherein the article is a film, and further an extruded film.

A4] The article of Y3] or Z3] above, wherein the article is a film comprising ≤2 layers, and further one layer.

B4] The article of Y3] above, wherein the article is a solar cell module.

C4] A process of forming a solar cell module, said process comprising laminating an array of solar cells between two film layers, and wherein each film layer is, independently, formed from the composition of any one of A]-X3] above.

D4] The process of C4] above, wherein each film layer is formed from the same composition.

Test Methods
MDR Test

Cure characteristics were measured using an Alpha Technologies Moving Die Rheometer (MDR) 2000 E, according to ASTM D5289, with a 0.5 deg arc. The MDR was loaded with 5 g of each uncured polymer composition (extruded film), and run, at a temperature of 145° C., for 30 minutes, to produce the "time vs torque" curve for the composition over the given interval. The following data were used from each MDR test: a) MH (dNm): the maximum torque exerted by the MDR during the 30-minute testing interval (this usually corresponds to the torque exerted at 30-minutes); and b) t90 or the time to reach 90% of the MH value.

Glass Adhesion Test

Each laminated sample was cut into three specimens, each"one inch" in width (see FIG. 1 (middle)). The 180° peel test, as shown in FIG. 1 (right), was used to measure the glass adhesion strength (average glass adhesion strength from 1" to 2"). The test was conducted on an INSTRON TM 5565, under controlled ambient conditions. Six specimens were tested, and the average of the results was calculated. The initial strength, and the strength after aging, at the temperature 85° C. and 85% humidity for 1000 hours (Damp Heating Aging Test), were recorded, and the maintenance ratio was calculated.

Volume Resistivity Test

The volume resistivity test was based on ASTM D257. The measurement was made using a KEITHLEY 6517 B electrometer, combined with a KEITHLEY 8009 test fixture. The leakage current was directly read from the instrument, and used in the following equation to calculate the volume resistivity:

$$\rho = \frac{V \times A}{I \times t},$$

where ρ is volume resistivity (ohm·cm), V is applied voltage (volts), A is electrode contact area (cm$^2$), and l is leakage current (amps). The thickness (t) of the cured film prepared by compression molding was measured before the test. Five points on the compression molded film were measured to get the average "t value," and this value was incorporated into the above equation to determine the volume resistivity. The test was conducted at 1000 voltage and at room temperature. For each composition, two compression molded films were tested for an average volume resistivity.

Melt Index

The melt index (I2) of an ethylene-based polymer is measured in accordance with ASTM D-1238, condition 190° C./2.16 kg (melt index (I5) at 190° C./5.0 kg, melt index (I10) at 190° C./10.0 kg, high load melt index (I21) at 190° C./21.0 kg). The melt flow rate (MFR) of a propylene-based polymer is measured in accordance with ASTM D-1238, condition 230° C./2.16 kg.

Polymer Density

Polymer density is measured in accordance with ASTM D-792.

Gel Permeation Chromatography

The chromatographic system consisted of a PolymerChar GPC-IR (Valencia, Spain) high temperature GPC chromatograph, equipped with an internal IR5 infra-red detector (IR5). The autosampler oven compartment was set at 160° Celsius, and the column compartment was set at 150° Celsius. The columns were four AGILENT "Mixed A" 30 cm 20-micron linear mixed-bed columns. The chromatographic solvent was 1,2,4-trichloro-benzene, which contained 200 ppm of butylatedhydroxytoluene (BHT). The solvent source was nitrogen sparged. The injection volume used was 200 microliters, and the flow rate was 1.0 milliliters/minute.

Calibration of the GPC column set was performed with 21 narrow molecular weight distribution polystyrene standards, with molecular weights ranging from 580 to 8,400,000, and which were arranged in six "cocktail" mixtures, with at least a decade of separation between individual molecular weights. The standards were purchased from Agilent Technologies. The polystyrene standards were prepared at "0.025 grams in 50 milliliters" of solvent, for molecular weights equal to or greater than 1,000,000, and at "0.05 grams in 50 milliliters" of solvent, for molecular weights less than 1,000, 000. The polystyrene standards were dissolved at 80 degrees Celsius, with gentle agitation, for 30 minutes. The polystyrene standard peak molecular weights were converted to polyethylene molecular weights using Equation 1 (as described in Williams and Ward, J. Polym. Sci., Polym. Let., 6, 621 (1968)):

$M_{polyethylene}=A \times (M_{polystyrene})^B$ (EQ1), where M is the molecular weight, A has a value of 0.4315 and B is equal to 1.0.

A fifth order polynomial was used to fit the respective polyethylene-equivalent calibration points. A small adjustment to A (from approximately 0.375 to 0.445) was made to correct for column resolution and band-broadening effects, such that linear homopolymer polyethylene standard is obtained at 120,000 Mw.

The total plate count of the GPC column set was performed with decane (prepared at 0.04 g in 50 milliliters of TCB, and dissolved for 20 minutes with gentle agitation.)

The plate count (Equation 2) and symmetry (Equation 3) were measured on a 200 microliter injection according to the following equations:

$$\text{Plate Count} = 5.54 * \left( \frac{(RV_{Peak\,Max})}{\text{Peak Width at } \frac{1}{2} \text{ height}} \right)^2, \quad (EQ\ 2)$$

where RV is the retention volume in milliliters, the peak width is in milliliters, the peak max is the maximum height of the peak, and ½ height is ½ height of the peak maximum; and $$\text{Symmetry} = \frac{(\text{Rear Peak } RV_{one\,tenth\,height} - RV_{Peak\,max})}{(RV_{Peak\,max} - \text{Front Peak } RV_{one\,tenth\,height})}, \quad (EQ\ 3)$$

where RV is the retention volume in milliliters, and the peak width is in milliliters, Peak max is the maximum position of the peak, one tenth height is 1/10 height of the peak maximum, and where rear peak refers to the peak tail at later retention volumes than the peak max, and where front peak refers to the peak front at earlier retention volumes than the peak max. The plate count for the chromatographic system should be greater than 18,000, and symmetry should be between 0.98 and 1.22.

Samples were prepared in a semi-automatic manner with the PolymerChar "Instrument Control" Software, wherein the samples were weight-targeted at 2 mg/ml, and the solvent (contained 200 ppm BHT) was added to a pre nitrogen-sparged, septa-capped vial, via the PolymerChar high temperature autosampler. The samples were dissolved for two hours at 160° Celsius under "low speed" shaking.

The calculations of $Mn_{(GPC)}$, $Mw_{(GPC)}$, and $Mz_{(GPC)}$ were based on GPC results using the internal IR5 detector (measurement channel) of the PolymerChar GPC-IR chromatograph according to Equations 4-6, using PolymerCharGPCOne™ software, the baseline-subtracted IR chromatogram at each equally-spaced data collection point (i), and the polyethylene equivalent molecular weight obtained from the narrow standard calibration curve for the point (i) from Equation 1. Equations 4-6 are as follows:

$$Mn_{(GPC)} = \frac{\sum_i IR_i}{\sum_i (IR_i / M_{polyethylene_i})}, \quad (EQ\ 4)$$

$$Mw_{(GPC)} = \frac{\sum_i (IR_i * M_{polyethylene_i})}{\sum_i IR_i}, \quad (EQ\ 5)$$

and $$Mz_{(GPC)} = \frac{\sum_i (IR_i * M_{polyethylene_i}^2)}{\sum_i (IR_i * M_{polyethylene_i})}. \quad (EQ\ 6)$$

In order to monitor the deviations over time, a flowrate marker (decane) was introduced into each sample, via a micropump controlled with the PolymerChar GPC-IR system. This flowrate marker (FM) was used to linearly correct the pump flowrate (Flowrate(nominal)) for each sample, by RV alignment of the respective decane peak within the sample (RV(FM Sample)), to that of the decane peak within the narrow standards calibration (RV(FM Calibrated)). Any changes in the time of the decane marker peak were then assumed to be related to a linear-shift in flowrate (Flowrate (effective)) for the entire run. To facilitate the highest accuracy of a RV measurement of the flow marker peak, a least-squares fitting routine was used to fit the peak of the flow marker concentration chromatogram to a quadratic equation. The first derivative of the quadratic equation was then used to solve for the true peak position. After calibrating the system, based on a flow marker peak, the effective flowrate (with respect to the narrow standards calibration) was calculated as Equation 7: Flowrate(effective)=Flowrate (nominal)*(RV(FM Calibrated)/RV(FM Sample)) (EQ7). Processing of the flow marker peak was done via the PolymerCharGPCOne™ Software. Acceptable flowrate correction is such that the effective flowrate should be within +/−0.7% of the nominal flowrate.

Differential Scanning calorimetry (DSC)

Differential Scanning calorimetry (DSC) is used to measure Tm, Tc, Tg and crystallinity in ethylene-based (PE) samples and propylene-based (PP) samples. Each sample (0.5 g) was compression molded into a film, at 5000 psi, 190° C., for two minutes. About 5 to 8 mg of film sample was weighed and placed in a DSC pan. The lid was crimped on the pan to ensure a closed atmosphere. The sample pan was placed in a DSC cell, and then heated, at a rate of approximately 10° C./min, to a temperature of 180° C. for PE (230° C. for PP). The sample was kept at this temperature for three minutes. Then the sample was cooled at a rate of 10° C./min to −90° C. for PE (−60° C. for PP), and kept isothermally at that temperature for three minutes. The sample was next heated at a rate of 10° C./min, until complete melting (second heat). Unless otherwise stated, melting point (Tm) and the glass transition temperature (Tg) of each polymer were determined from the second heat curve, and the crystallization temperature (Tc) was determined from the first cooling curve. The respective peak temperatures for the Tm and the Tc were recorded. The percent crystallinity can be calculated by dividing the heat of fusion (Hf), determined from the second heat curve, by a theoretical heat of fusion of 292 J/g for PE (165 J/g for PP), and multiplying this quantity by 100 (for example, % cryst.=(Hf/292 J/g)×100 (for PE)).

EXPERIMENTAL

Polymer and Additives

Ethylene/1-octene random copolymer:density 0.880 g/cc, I2 18.0 g/10 min, Mn 22951 g/mol, MWD 2.16, Tm 81° C., Tc 57° C., Tg−47° C. (for example, XUS 38661 from The Dow Chemical Company). This copolymer is noted as "POE" in the table below.

Tert-butylperoxy 2-ethylhexyl carbonate (noted as "TBEC" in table below): organic peroxide (for example, from J&K Scientific Ltd.).

5-Hexenyltrimethoxysilane (noted as "SC1" in table below): Si-containing compound (for example, DOW SIL Z-6161 EX Silane from The Dow Chemical Company).

Trimethoxysilylpropanethiol (noted as "SC2" in table below): Si-containing compound (for example, XIAMETER OFS-6062 from The Dow Chemical Company).

Tetraethylorthosilicate (noted as "SC3" in table below): Si-containing compound (for example, XIAMETER 6697 from The Dow Chemical Company).

A vinyl oligomericsiloxane (noted as "SC4" in table below): Si-containing compound (for example, DYNASYLAN 6598 from EVONIK).

3-(Trimethoxysilyl)propyl-methacrylate (noted as "SCC" in table below): Si-containing compound (for example, XIAMETER OFS-6030 from The Dow Chemical Company).

Triallylisocyanurate (noted as "TAIL" in table below): crosslinking coagent (for example from Fangruida Chemicals Co., Ltd).

Bis-(2,2,6,6-tetramethyl-4-piperidinyl)sebacate (noted as "T770" in table below): hindered amine light stabilizer (for example, TINUVIN 770 from BASF).

Backsheet: ZTT-KPE (PVDF/PET/PEVA) available from Zhongtian Photovoltaic Materials Co., Ltd.

Polymer Compositions

The inventive and comparative compositions were prepared according to formulations as listed in Table 1. The comparative composition is representative of current compositions used in photovoltaic encapsulant films.

TABLE 1

Polymer Compositions

| Component | Comparative Example | Inventive Example 1 | Inventive Example 2 | Inventive Example 3 | Inventive Example 4 |
|---|---|---|---|---|---|
| POE (wt %) | 98.18 | 98.18 | 98.18 | 98.03 | 98.18 |
| Peroxide-TBEC (wt %) | 1 | 1 | 1 | 1 | 1 |
| SCC (wt %) | 0.25 | — | — | — | — |
| SC1 (wt %) | — | 0.25 | — | — | — |
| SC2 (wt %) | — | — | 0.25 | 0.1 | — |
| SC3 (wt %) | — | — | — | 0.3 | — |
| SC4 (wt %) | — | — | — | — | 0.25 |
| Coagent-TAIC (wt %) | 0.5 | 0.5 | 0.5 | 0.5 | 0.5 |
| T770 (wt %) | 0.07 | 0.07 | 0.07 | 0.07 | 0.07 |
| Total (wt %) | 100 | 100 | 100 | 100 | 100 |

For each polymer composition, the organic peroxide, Si-containing compound, crosslinking coagent and POE resin (pellets) were weighed at the desired the percentage, and premixed into a sealable bottle. The bottle and its contents were shaken for one minute, and then placed in an oven, equilibrated at 40° C., for soaking the additives into the POE resin. For the first 60 minutes in the oven, the bottle was shaken every 10 minutes, to keep a homogenous distribution of the curing package. After the 60-minute interval, the bottle was kept in the oven at 40° C. for 15-20 hours (overnight).

Film Extrusion

The pellets, after soaking, were fed into the BRABENDER single screw extruder with three barrels. The temperature of each barrel and the temperature of the die were set at 100° C., and the screw speed was 40 rpm. Around "0.5 mm thick POE extruded films" were prepared, and then kept in an aluminum foil bag for testing.

Compression Molding

The extruded film (POE film) was cured during the compression molding process. The extruded film was preheated at 120° C. for five minutes, and then degassed, followed by a 15-minute pressing process at 10 MPa at 150° C., to insure the complete curing of the sample. The temperature was then ramp down to room temperature. The compression molded films were used for the volume resistivity test.

Lamination

For each sample, a glass substrate (4 inch×6 inch×0.12 inch (thick)) was used. The substrate was cleaned using water, and then dried before use. The backsheet, with a thickness of 0.35 mm, was cut into "4×6 square inch" pieces. The extruded film (POE film) was cut to fit the size of the glass and the size of the backsheet, respectively. The backsheet, extruded film and glass were layered together (from top to bottom: backsheet, POE film and glass) before lamination. The lamination process was conducted on a PENERGY L036 laminator at 150° C. for 20 minutes (4-minute vacuum process (vacuum pressure −0.095 MPa) and 16-minute pressing (pressing pressure 0.075 MPa)), to form a "glass-film-backsheet" laminate. The thickness of the laminates ranged from 3.9 mm to 4.0 mm. The laminated samples were used for glass adhesion test.

Test Results

Cure, volume resistivity and adhesion properties are shown in Table 2.

TABLE 2

Properties of Comparative Examples and Inventive Examples

| Component | Comparative Example | Inventive Example 1 | Inventive Example 2 | Inventive Example 3 | Inventive Example 4 |
|---|---|---|---|---|---|
| MH (dNm) | 2.78 | 2.65 | 1.95 | 3.05 | 3.21 |
| t90 (min) | 17.53 | 17.08 | 22.14 | 18.82 | 10.72 |
| VR @ RT (ohm · cm) | $1.3 * 10^{16}$ | $2.6 * 10^{16}$ | $5.7 * 10^{16}$ | $1.9 * 10^{17}$ | $2.1 * 10^{17}$ |
| Initial glass adhesion strength ((N/cm)) | 148.8 | 96.6 | 155.1 | 143.4 | 151.8 |
| Glass adhesion strength after aging at 85° C., 85% humidity for 1000 h (N/cm) | 67.3 | 77.0 | 109.4 | 115.3 | 108.2 |
| Glass adhesion strength maintenance after 1000 h, 85° C., 85% humidity aging | 45.2% | 79.7% | 70.5% | 80.4% | 71.3% |

It has been discovered that the inventive compositions provide acceptable glass adhesion strength, before and after aging. The crosslinking coagent also promoted the curing of these compositions. The Inventive Example 1, with SC1 as the Si-containing compound, maintained higher glass adhesion after aging at 85° C. and 85% humidity for 1000 hours (Damp Heat Aging Test), as compared to the Comparative Example with SCC as the Si-containing compound. The inventive example had good volume resistivity (VR). The t90 of the inventive sample was slightly shorter than the comparative sample, indicating that the "SC1" provides for a slight increase in the curing rate, while sacrificing a bit of torque after curing.

The Inventive Example 2, with SC2 as the Si-containing compound, also maintained higher glass adhesion after the Damp Heat Aging Test, as compared to the Comparative Example. The inventive example also had excellent initial glass adhesion and good volume resistivity. However, the t90 of Inventive Example 2 was longer than that of the comparative sample, and the MH was lower than that of the Comparative Example. It is speculated that the thiol group of the SC2 reacts with peroxide, resulting in a lower crosslinking degree, i.e., a lower MH. By decreasing the dosage of SC2, and adding some SC3 into the formulation, the glass adhesion property and the curing behavior can be balanced, as seen in Inventive Example 3. Inventive Example 3 had excellent initial glass adhesion, and maintained glass adhesion after the aging test, and excellent volume resistivity. The Inventive Example 4, with SC4 as the Si-containing compound, also had excellent initial glass adhesion, and maintained glass adhesion after the aging test. This example had excellent volume resistivity.

Polymer compositions have been discovered that provide good adhesion to glass and excellent maintenance of this glass adhesion, which is one of the most important property features required for a photovoltaic encapsulant film. These compositions also have high crosslinking rates and high volume resistivities.

What is claimed is:

1. A composition comprising the following:
   a) an ethylene alpha-olefin interpolymer;
   b) a peroxide;
   c) a mixture of Si-containing compounds comprising:

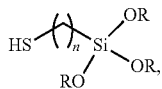

ii)

where each R is independently methyl or ethyl, and n is from 1 to 18; and

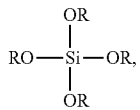

iii)

where each R is independently methyl or ethyl wherein the weight ratio of component iii) to component ii) is ≥2.0.

2. The composition of claim 1 wherein the mixture of Si-containing compounds comprises

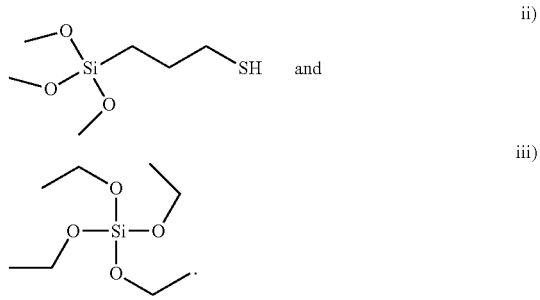

3. The composition of claim 1, wherein the weight ratio of component iii) to component ii) is ≤4.0.

4. The composition of claim 1, wherein the composition comprises ≥98.5 wt % of the sum of components a)-c), based on the weight of the composition.

5. The composition of claim 1, wherein the ethylene alpha-olefin interpolymer (component a) has a density ≥0.860 g/cc (1 cc=1 cm$^3$).

6. The composition of claim 1, wherein the ethylene alpha-olefin interpolymer has a density ≤0.900 g/cc.

7. A crosslinked composition formed from the composition of claim 1.

8. The composition of claim 1, wherein the composition has a glass adhesion strength ≥90 N/cm.

9. The composition of claim 1, wherein the composition has a glass adhesion strength, after aging at 85° C., 85% humidity, 1000 h, ≥70 N/cm.

10. The composition of claim 1, wherein the composition has a Volume Resistivity ≥1.0×10$^{14}$ ohm·cm at room temperature.

11. The composition of claim 1, wherein the composition has a Volume Resistivity ≥1.0×10$^{17}$ ohm·cm at room temperature.

12. An article comprising at least one component formed from the composition of claim 1.

13. A process of forming a solar cell module, said process comprising laminating an array of solar cells between two film layers, and wherein each film layer is, independently, formed from the composition of claim 1.

* * * * *